(12) United States Patent
Moseley et al.

(10) Patent No.: US 11,442,569 B2
(45) Date of Patent: Sep. 13, 2022

(54) APPARATUS AND METHOD FOR SENSING PRESSURE

(71) Applicant: Tactual Labs Co., New York, NY (US)

(72) Inventors: Braon Moseley, Round Rock, TX (US); Adam Landa, Forest City, FL (US)

(73) Assignee: Tactual Labs Co., New York, NY (US)

( * ) Notice: Subject to any disclaimer, the term of this patent is extended or adjusted under 35 U.S.C. 154(b) by 219 days.

(21) Appl. No.: 16/272,256

(22) Filed: Feb. 11, 2019

(65) Prior Publication Data

US 2019/0250753 A1 Aug. 15, 2019

Related U.S. Application Data

(60) Provisional application No. 62/631,185, filed on Feb. 15, 2018.

(51) Int. Cl.
| | | |
|---|---|---|
| *G06F 3/041* | (2006.01) | |
| *G06F 3/044* | (2006.01) | |
| *G01L 1/14* | (2006.01) | |
| *G01L 1/20* | (2006.01) | |

(52) U.S. Cl.
CPC ............ *G06F 3/0414* (2013.01); *G01L 1/144* (2013.01); *G06F 3/044* (2013.01); *G01L 1/14* (2013.01); *G01L 1/205* (2013.01); *G06F 3/0446* (2019.05); *G06F 3/0447* (2019.05); *G06F 3/04144* (2019.05); *G06F 2203/04104* (2013.01)

(58) Field of Classification Search
CPC ...... G06F 3/0414; G06F 3/044; G06F 3/0447; G06F 3/04144; G06F 3/0446; G06F 2203/04104; G01L 1/144; G01L 1/14; G01L 1/205
See application file for complete search history.

(56) References Cited

U.S. PATENT DOCUMENTS

| | | | |
|---|---|---|---|
| 4,731,694 A * | 3/1988 | Grabner | G06F 3/04146 361/280 |
| 5,010,774 A * | 4/1991 | Kikuo | G06F 3/0414 73/862.046 |
| 2010/0007625 A1 * | 1/2010 | Jiang | G06F 3/045 345/173 |

(Continued)

FOREIGN PATENT DOCUMENTS

WO WO-2019129390 A1 * 7/2019 ............... B32B 5/18

*Primary Examiner* — Jonathan M Dunlap
(74) *Attorney, Agent, or Firm* — Adam Landa

(57) ABSTRACT

A pressure sensor is disclosed which includes a transmit electrode adapted to be operatively connected to a signal generator, a receive electrode adapted to be operatively connected to a signal receiver and signal processor, and a variably resistive conductive deformable element. The transmit electrode, the receive electrode and the variably resistive conductive deformable element being positioned in proximity to each other such that a pressure event proximate to the variably resistive conductive deformable element causes a change in coupling between the transmit electrode and the receive electrode, and a signal transmit on the transmit electrode as received on the receive electrode is changed in at least one of magnitude or phase in relation to and as a result of a pressure event.

20 Claims, 8 Drawing Sheets

(56) References Cited

U.S. PATENT DOCUMENTS

| | | | |
|---|---|---|---|
| 2010/0156842 A1* | 6/2010 | Cherif | G06F 3/045 345/174 |
| 2013/0127779 A1* | 5/2013 | Lillie | G06F 3/0416 345/174 |
| 2013/0169581 A1* | 7/2013 | Small | G06F 3/041 345/174 |
| 2014/0218057 A1* | 8/2014 | White | G01R 3/00 324/686 |
| 2015/0091859 A1* | 4/2015 | Rosenberg | G06F 3/0445 345/174 |
| 2015/0109212 A1* | 4/2015 | Yao | G06F 3/044 345/173 |
| 2015/0277620 A1* | 10/2015 | Bulea | G06F 3/0202 345/168 |
| 2016/0283007 A1* | 9/2016 | Ogura | G01L 1/146 |
| 2017/0024051 A1* | 1/2017 | De Araujo | G06F 3/0416 |
| 2017/0024056 A1* | 1/2017 | Wilkinson | G06F 3/0445 |
| 2017/0024074 A1* | 1/2017 | Forlines | G06F 3/0416 |
| 2017/0350771 A1* | 12/2017 | Chern | B81B 7/0029 |
| 2018/0224992 A1* | 8/2018 | Hong | G06F 3/0412 |
| 2018/0253183 A1* | 9/2018 | Imanilov | H04L 5/0021 |
| 2018/0253184 A1* | 9/2018 | Imanilov | G06F 3/0418 |
| 2018/0253185 A1* | 9/2018 | Imanilov | G06F 3/0418 |
| 2018/0267639 A1* | 9/2018 | Han | G06F 3/041 |

\* cited by examiner

APPARATUS AND METHOD FOR SENSING PRESSURE

This Application claims the benefit of U.S. Provisional Application Ser. No. 62/631,185, filed Feb. 15, 2018, the contents of which are hereby incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed apparatus and method relate in general to the field of sensors, and in particular to a pressure sensor sensitive to light touch.

BACKGROUND

In recent years sensing technologies have been developing. An avenue of development has surrounded detecting proximity based on direct interactions between a hand and a field surrounding a taxel. See, e.g., U.S. Patent Publication No. 2009/0251435A1. More recently, developments have been made in detecting both touch and hover based on direct interactions between a hand or stylus and a field surrounding a taxel. See, e.g., U.S. Pat. Nos. 9,019,224B2 and 9,830,015B2, the contents of which are hereby incorporated by reference. By changing the deformation (i.e., change in interacting shape) of a deformable touch element has also been proposed as a way to measure pressure. See, e.g., U.S. Patent Publication No. 2014/0354584. Instead of looking at the deformation of the deformable touch element, the use of a deformable material between electrodes has been proposed to permit analysis of changing positional relationships of the electrodes as a measure of pressure. See, e.g., U.S. Patent Publication No. 2007/0205995. It has also been proposed to measure pressure by including conductive or high dielectric patches of material in a deformable layer within a sensor stackup, and measuring the effect of the displacement of the patches in response to contact. See, e.g., PCT/US2017/050547. Better, less expensive and more accurate pressure sensors are needed.

More particularly, what is needed is a pressure sensor that can provide more detailed information concerning touch. What is also needed is a pressure sensor that can provide substantial information concerning the localization of touch and pressure, which information can be streamed to downstream processes that seek to understand pressure interactions. In some embodiments, what is further needed is a pressure sensor that is flexible, and can detect pressure while undergoing substantial deformation of the sensor itself.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Figure 1:
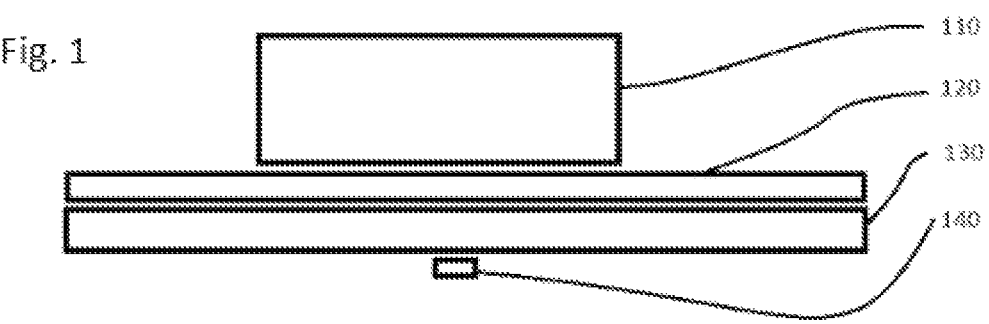
FIGS. 1-3 show a section/side view of a high level stackup diagram illustrating three states of one embodiment of a pressure sensor in accordance with this disclosure.

This application employs principles used in fast multi-touch sensors and other interfaces disclosed in the following U.S. Pat. Nos. 9,019,224B2; 9,811,214B2; 9,804,721B2; 9,710,113B2; 9,158,411B2; 9,933,880B2 and the following U.S. patent application Ser. Nos. 15/162,240; 15/690,234; 15/195,675; 15/200,642; 15/821,677; 62/540,458; 62/575,005; 62/619,656 and PCT publication PCT/US2017/050547, familiarity with the disclosure, concepts and nomenclature therein is presumed. The entire disclosure of those application and the applications incorporated therein by reference are incorporated herein by reference.

In various embodiments, the present disclosure is directed to sensors, and methods for designing, manufacturing and operating such sensors, and in particular to sensors used to sense pressure. Throughout this disclosure, various sensor shapes and sensor patterns are used for illustrative purposes. Although example compositions and/or geometries are disclosed for the purpose of illustrating the invention, other compositions and geometries will be apparent to a person of skill in the art, in view of this disclosure, without departing from the scope and spirit of the disclosure herein.

Throughout this disclosure, the terms "hover", "touch", "touches," "contact," "contacts," "pressure," "pressures," "touch events" or other descriptors may be used to describe events or periods of time during which a sensor interaction takes place—i.e., a user's finger, a stylus, an object or a body part is detected by the sensor. In some embodiments, and as generally denoted by the word "contact", these detections occur as a result of physical contact with a sensor, or a device in which it is embodied. In other embodiments, and as sometimes generally referred to by the term "hover", the sensor may be tuned to allow the detection of "touches" that are hovering at a distance above the touch surface or otherwise separated from the touch sensitive device. As used herein, "touch surface" may not have actual features and may be a generally feature-sparse surface. The use of language within this description that implies reliance upon sensed physical contact should not be taken to mean that the techniques described apply only to those embodiments; indeed, generally, what is described herein may apply equally to "contact" and "hover", each of which being a "touch". More generally, as used herein, the term "touch" refers to an act that can be detected by the types of sensors disclosed herein, thus, as used herein the term "hover" is one type of "touch" in the sense that "touch" is intended herein. "Pressure" refers to the force per unit area exerted by a contact (e.g., from a fingers, hand or object) against the surface of an object. The sensors disclosed may be used to localize and quantify "pressure". A lack of pressure is generally identified by signals being below a threshold for accurate measurement by the sensor. Thus, as used herein, the phrase "touch event" and the word "touch" when used as a noun include a near touch and a near touch event, or any other gesture that can be identified using a sensor. In accordance with an embodiment, touch or pressure events may be detected, processed and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency—e.g., the first frequency being 10 Mhz and the second frequency being 10 Mhz; or could be different frequencies—e.g., the first frequency being 10 Mhz and the second frequency being 11 Mhz. Context may dictate otherwise, for example, where a first and a second frequency are further limited to being frequency-orthogonal to each other in frequency, in which case, they could not be the same frequency.

Figure 2:
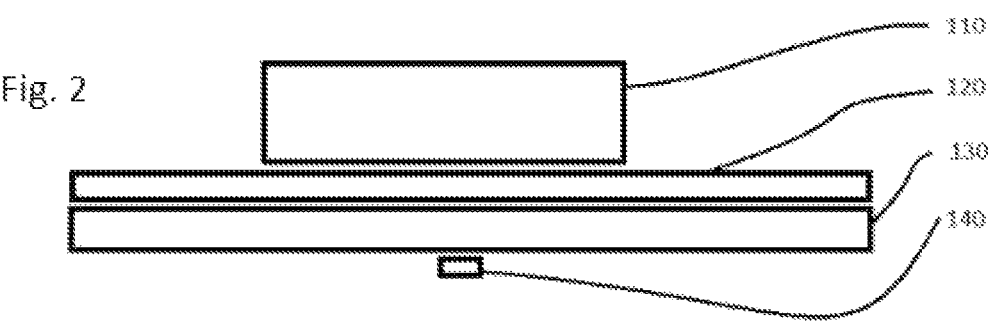
Figure 3:
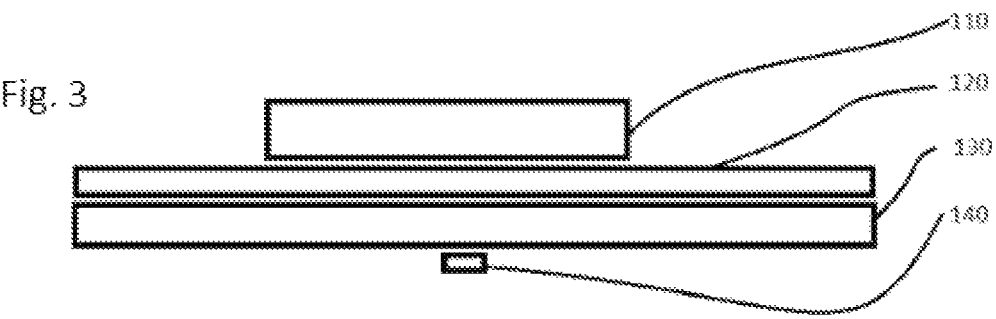

Turning first to high level stackup diagram shown in FIGS. 1-3 showing three states of an embodiment of a pressure sensor. Electrodes 120, 140 are separated by a dielectric 130. It should be understood that the term "electrode" is used throughout this application, however the term "electrode" may be used interchangeably with the terms "antenna" or "conductor." In an embodiment, the dielectric is substantially rigid in the dimension between the electrodes, thus maintaining a fixed distance between the electrodes. In an embodiment, one of the electrodes 120, 140 is operatively connected to a signal generator (not shown) that provides a stimulus signal and the other electrode 140, 120 is operatively connected to a receiver (also not shown). The receiver comprises or is operatively attached to circuitry (or software) for processing the received signals and detecting changes therein. In an embodiment, the signal generator, receiver and signal processor may be of the type described in U.S. Pat. No. 9,830,015B2, the contents of which are incorporated herein by reference.

Still referring to FIGS. 1-3, a deformable material 110 is placed in proximity to the electrode 120. In an embodiment, the deformable material 110 is directly in contact with the electrode 120. In an embodiment, a layer of material (not shown) separates the deformable material 110 and the electrode 120. In an embodiment, a layer of dielectric material (not shown) separates the deformable material 110 and the electrode 120. In an embodiment, a layer of polyamide film (not shown) such as Kapton® (a registered trademark of the E. I. Du Pont de Nemours and Company Corporation of Delaware) or another polyimide separates the deformable material 110 and the electrode 120.

In an embodiment, the deformable material 110 is elastomeric and non-conductive when not deformed, however, the deformable material 110 becomes conductive when deformed by compression, extension, torsion or bending. One example of such a material is described in U.S. Pat. Nos. 4,533,604; 5,162,775 and 5,536,568, each now expired. Another example of pressure sensitive conductive rubber can be found at www.rfmicrolink.com/products.html, which refers to it by the Zoflex brand name, and states: "These materials are at a high resistance state without pressure or the applied pressure is below the actuation pressure, but are at a very low resistance state when the applied pressure is equal to or higher than the actuation pressure. They have many applications such as in conductive rubber keypads and mechanical pressure switches." The materials are offered on the website in 0.02", 0.04" and 0.06" thicknesses.

FIG. 1 shows deformable material 110 in an uncompressed state, having high resistance, FIG. 2 shows deformable material 110 in a partially compress state, having medium resistance, and FIG. 3 shows deformable material 110 in a partially compressed state, having low resistance. In an embodiment, the change in resistance measurably affects the interaction between the transmitting and receiving electrodes 120, 140. The deformation of deformable material 110, and thus its resistance, is proportional to the force acting upon it. The resulting change in resistance measurably affects the interaction between the transmitting and receiving electrodes 120, 140. In an embodiment, change in resistance reduces the magnitude of the stimulating signal as measured on the receiving electrode. In an embodiment, change in resistance increases the magnitude of the stimulating signal as measured on the receiving electrode. In an embodiment, change in resistance changes the phase of the stimulating signal as measured on the receiving electrode. Regardless of the form the change, because it is caused by the change in resistance, which itself is caused by a change in pressure, the change in signal is reflective of the change in pressure.

Figure 4:
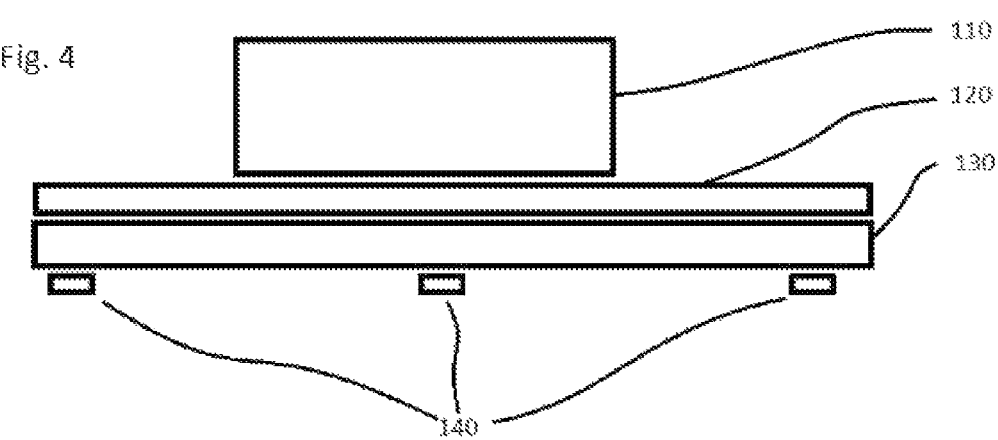
FIG. 4 shows a section/side view of a high level stackup diagram illustrating another embodiment of a pressure sensor in accordance with this disclosure.

Turning to FIG. 4, another embodiment of a pressure sensor is shown. The embodiment shown in FIG. 4 comprises a plurality of electrodes 140. As with the embodiment described in FIGS. 1-3, as the deformable material 110 is deformed, the resistance of at least a portion of the deformable material 110 changes. As above, in an embodiment, one of the electrodes 120, 140 is operatively connected to a signal generator (not shown) that provides a stimulus signal and the other electrode 140, 120 is operatively connected to a receiver (also not shown). The receiver comprises or is operatively attached to circuitry (or software) for processing the received signals and detecting changes therein. In an embodiment, the signal generator, receiver and signal processor may be of the type described in U.S. Pat. No. 9,830,015B2.

The change in resistance caused by deformation of the deformable material causes a change in the signals between the transmitting/stimulating electrode or electrodes (i.e., 120 or 140) and the receiving electrodes or electrode (i.e., 140 or 120). In an embodiment, pressure causing deformation on one side of the deformable material 110 will cause lower resistance there-below than at other portions of the deformable material 110. It will be apparent to a person of skill in the art in view of this disclosure that local variation in resistance change, e.g., by pressing on one side or the other of the deformable material (instead of uniformly across its surface) may be detected as a result of having a many-to-one relationship between the transmitters and a receiver, or between the receivers and a transmitter.

Figure 5:
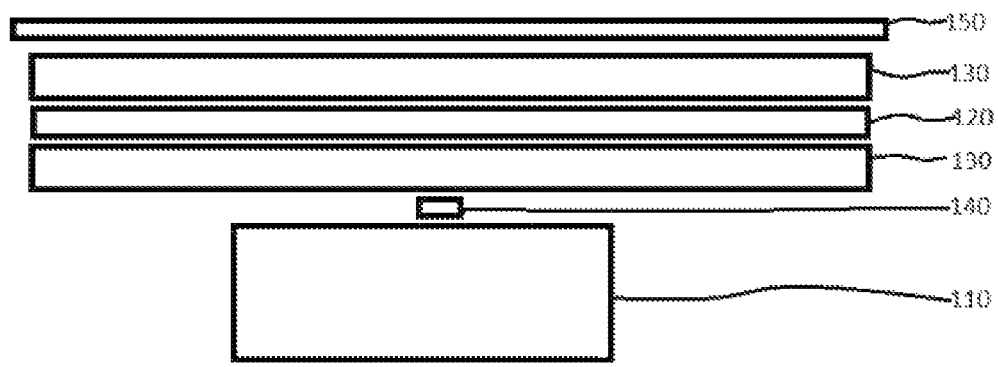
FIG. 5 shows a section/side view of a high level stackup diagram illustrating yet another embodiment of a pressure sensor in accordance with this disclosure.

FIG. 5 shows another embodiment of a pressure sensor. Electrodes 120, 140 are separated by a dielectric layer 130, and another dielectric layer separates electrode 120 from electromagnetic interference (EMI) shield 150. In an embodiment, the dielectric layers between the electrodes 120, 140 maintains the spacing there-between. The EMI shield 150 inhibits objects beyond the shield from capacitively interacting with the signals between the transmitting/stimulating electrode or electrodes (i.e., 120 or 140) and the receiving electrodes or electrode (i.e., 140 or 120). As above, in an embodiment, one of the electrodes 120, 140 is operatively connected to a signal generator and the other a receiver and ultimately to circuitry or software for processing the received signals.

In an embodiment, EMI shield 150, the dielectric layers 130 and the electrodes 120, 140 are flexible or flexibly mounted such that pressure (downward as shown in the drawing) on the EMI shield 150 will cause deformation of deformable material 110, and thus cause a measurable change in the transmitted signal as received by the receive electrode.

Figure 6:
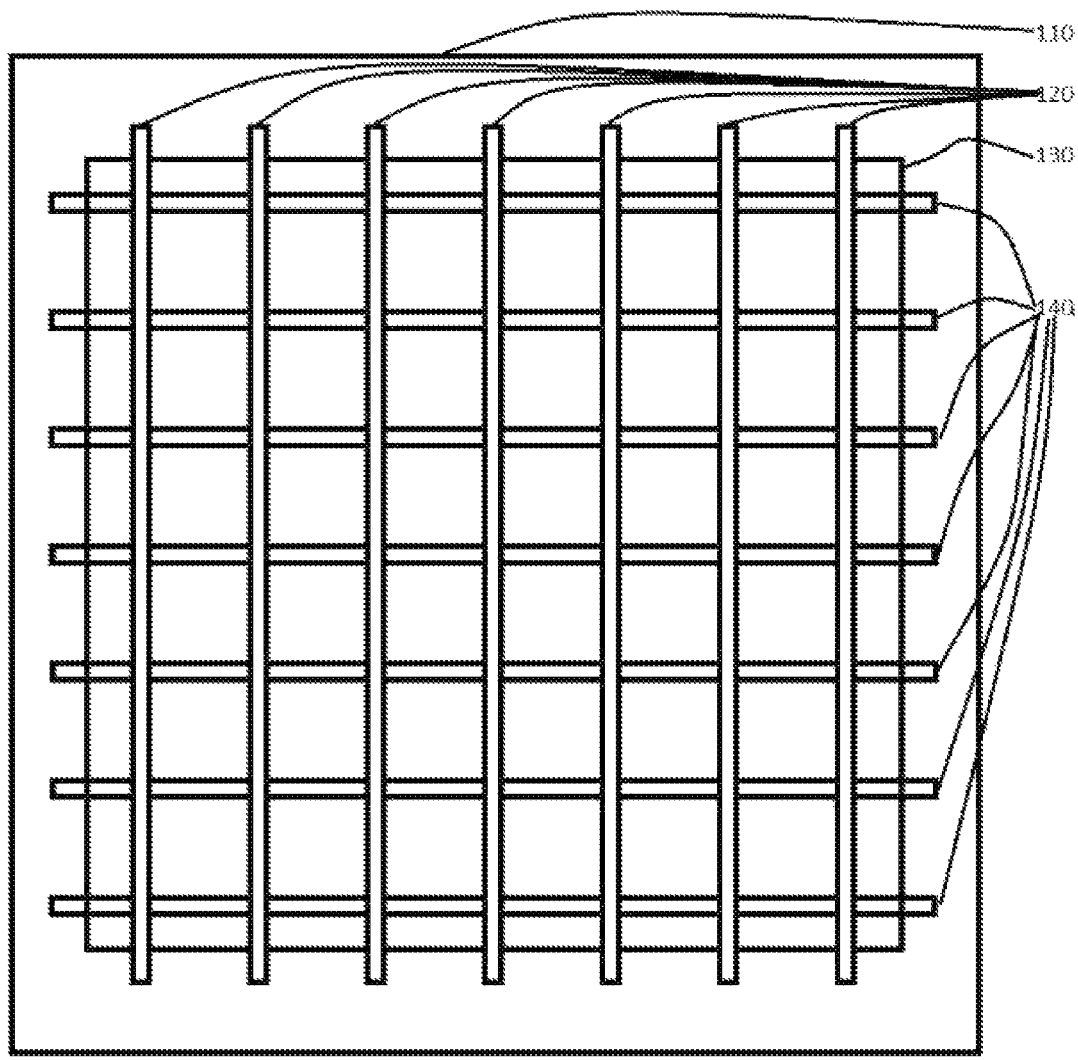
FIGS. 6-7 show a plan and section view of a high level diagram illustrating an embodiment of a pressure sensor in accordance with this disclosure.
Figure 7:
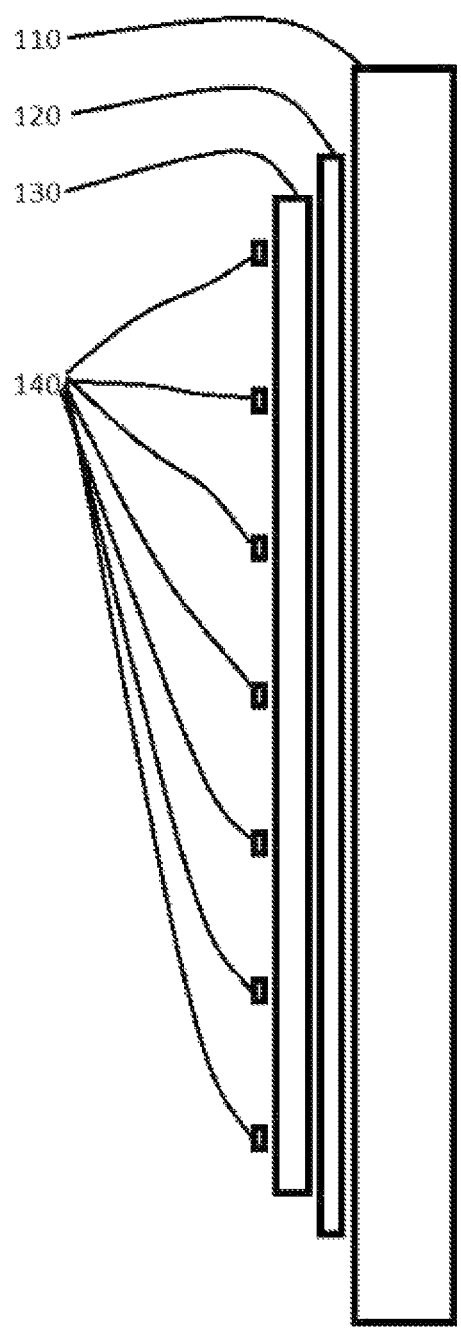

Turning now to FIGS. 6 and 7, a plan and section view are shown of a sensor stackup in accordance with an embodiment. Deformable material 110 overlays a set of electrodes, which is separated from another set of electrodes 140 by dielectric layer 130. One set of the electrodes is operatively connected to a signal generator and the other set a receiver and ultimately to circuitry or software for processing the received signals.

The change in resistance caused by deformation of the deformable material 110 (e.g., in the left direction in FIG. 7) causes a change in the transmitted stimulation signals as received on the receiving electrode set. In an embodiment, pressure causing deformation on one side of the deformable material 110 will cause lower resistance there-below than at other portions of the deformable material 110. It will be apparent to a person of skill in the art in view of this disclosure that local variation in resistance change will be seen only at some taxels and not at others. Moreover, it will be apparent to a person of skill in the art in view of this disclosure that while resistance is lower at the local deformations, the nature of the deformable material 100 will have its undeformed or high resistance in other areas beyond those affected by the pressure.

Figure 8:
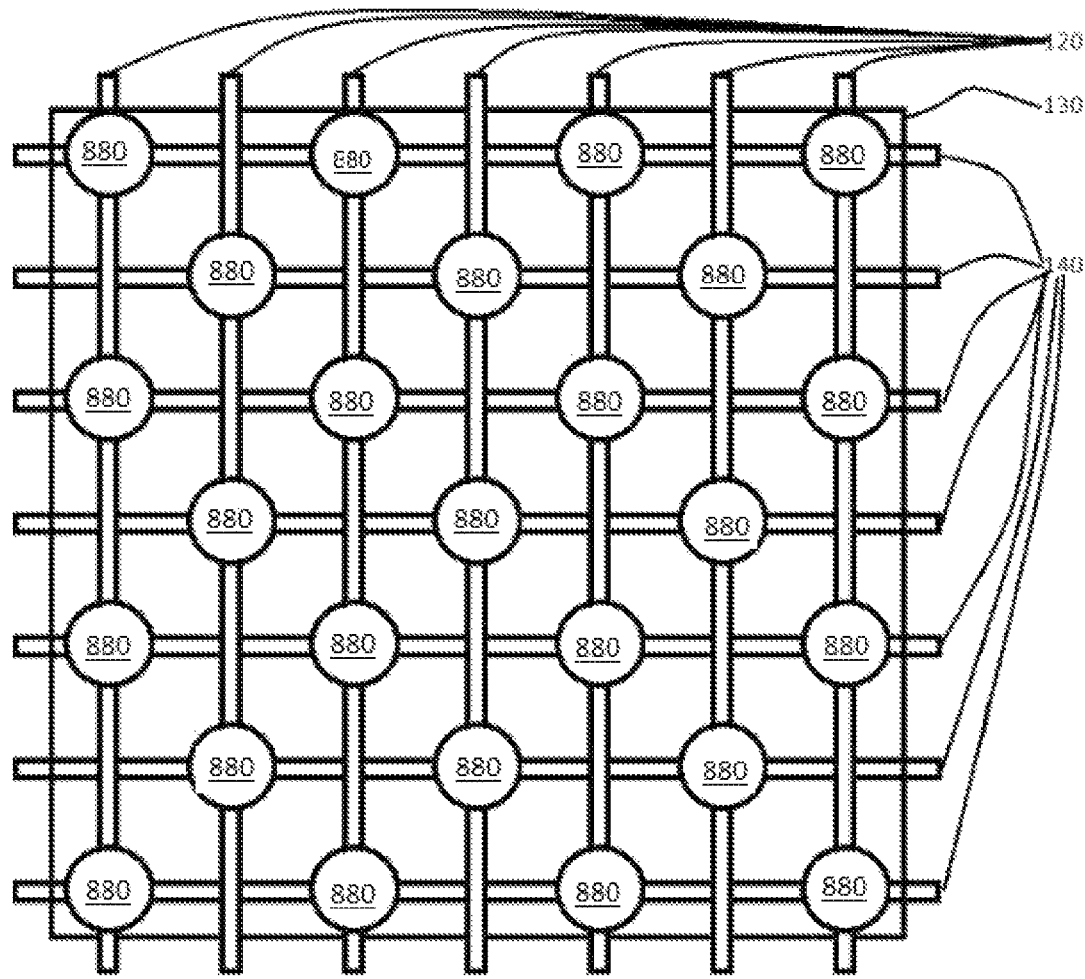
FIGS. 8-9 show a plan and section view of a high level diagram illustrating another embodiment of a pressure sensor in accordance with this disclosure.
Figure 9:
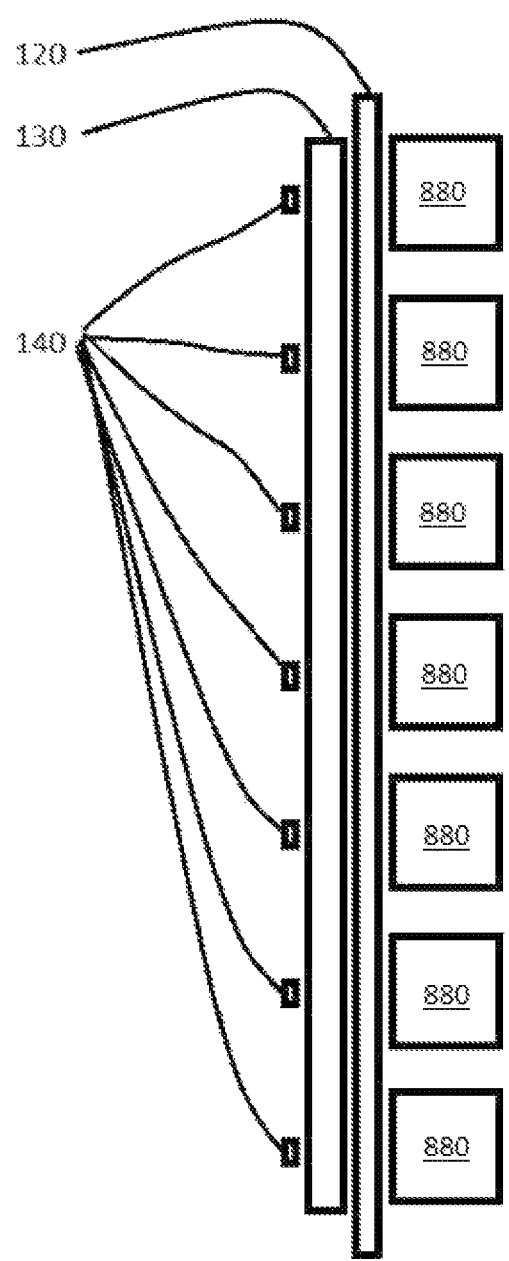

A plan and section view of a sensor stackup in accordance with another embodiment are shown in FIGS. 8 and 9. Electrode sets 120, 140 forming a grid are separated by a dielectric 130 that maintains spacing there-between. In an embodiment, one set of the electrodes is operatively connected to a signal generator and the other set a receiver and ultimately to circuitry or software for processing the received signals. In an embodiment, the dielectric 130 maintains constant spacing between the electrode sets 120, 140. A plurality of deformable material elements 880 are placed at or near the grid crossings, e.g., taxels. As with deformable material 110, the deformable material elements 880 exhibit variable resistance, increasing with pressure.

Because the conductive nature of deformable material elements 880 may impede hover range of the taxels, in an embodiment, the deformable material elements 880 are selectively placed on the sensor to permit unimpeded hover and contact sensing at those taxels, in addition to the pressure sensing described herein. In an embodiment, a non-conductive deformable material (not shown) is disposed on the surface making the surface even or smooth to the touch despite some areas having conductive material.

Figure 10:
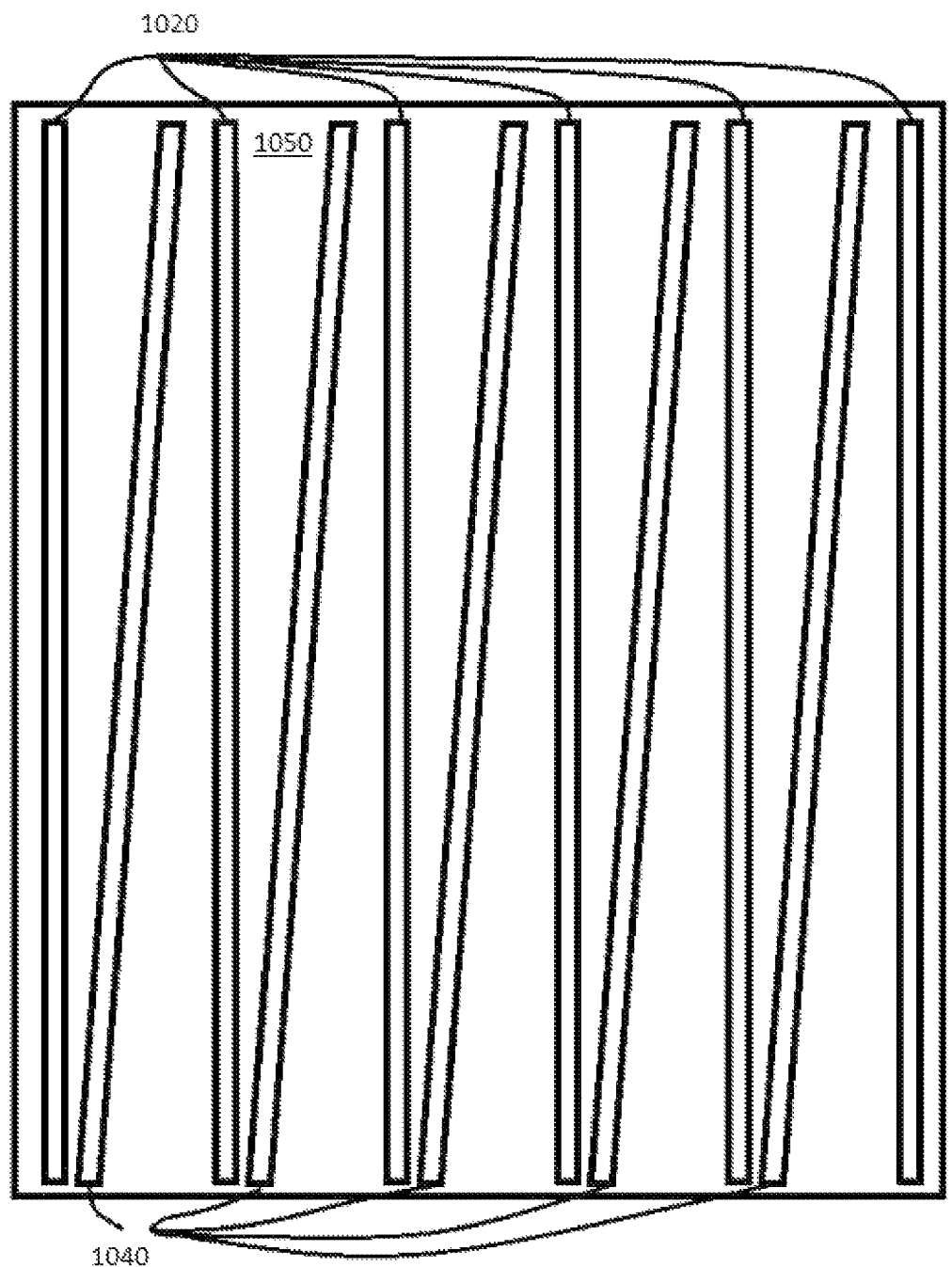
FIG. 10 shows a plan view of a high level diagram illustrating yet another embodiment of a pressure sensor in accordance with this disclosure.

FIG. 10 shows a bottom up plan view of another embodiment of a pressure sensor. Two sets of electrodes 1020, 1040 are placed in proximity to a layer of variably resistive conductive deformable material 1050. In an embodiment, one set of the electrodes is operatively connected to a signal generator and the other set a receiver and ultimately to circuitry or software for processing the received signals. The variably resistive conductive deformable material 1050 exhibits variable resistance that increases with pressure.

The taxels of this embodiment differ somewhat from those shown in the previous figures in this disclosure. See, e.g., U.S. patent application Ser. No. 15/690,234, incorporated herein by reference, for description concerning deployment of fast multi-touch to single layer designs such the one shown in FIG. 6. In an embodiment, the two sets of electrodes 1020, 1040 are affixed to the variably resistive conductive deformable material 1050. In an embodiment, the two sets of electrodes 1020, 1040 are affixed to the variably resistive conductive deformable material 1050 using tape. In an embodiment, the two sets of electrodes 1020, 1040 are affixed to the variably resistive conductive deformable material 1050 with a glue. In an embodiment, a thin dielectric layer such as Kapton is used between the two sets of electrodes 1020, 1040 and the variably resistive conductive deformable material 1050.

A change in resistance caused by deformation of the variably resistive conductive deformable material 1050 causes a change in the transmitted stimulation signals as received on the receiving electrode set. In an embodiment, pressure causing deformation on one side of the variably resistive conductive deformable material 1050 will cause locally lower resistance there-below than at other portions of the variably resistive conductive deformable material 1050. It will be apparent to a person of skill in the art in view of this disclosure that local variation in resistance change will be detected at some locations and not at others. Moreover, it will be apparent to a person of skill in the art in view of this disclosure that while resistance is lower at the local deformations, the nature of the variably resistive conductive deformable material 1050 will have its undeformed or high resistance in other areas beyond those affected by the pressure.

Figure 11:
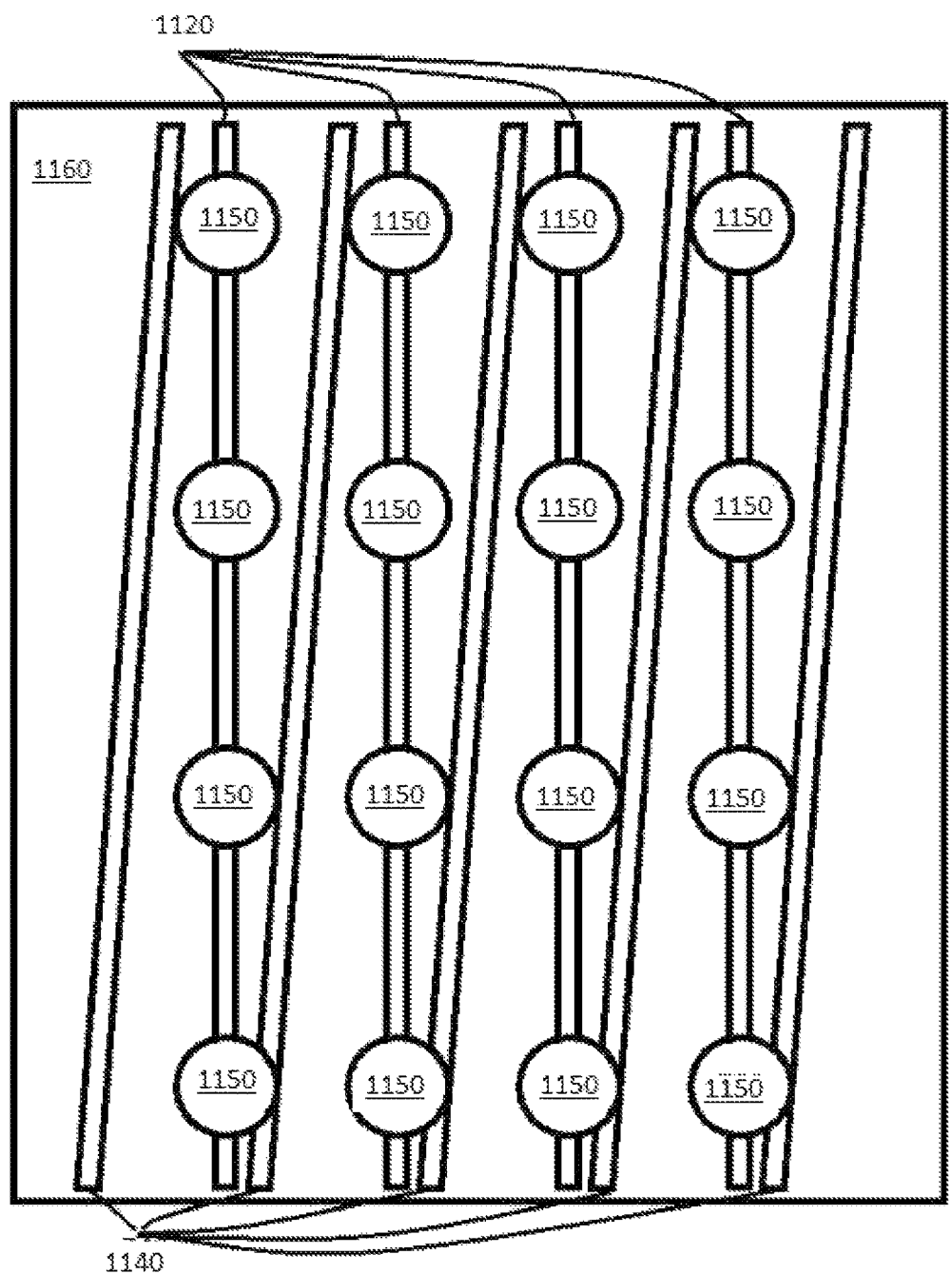
FIG. 11 shows a plan view of a high level diagram illustrating yet a further embodiment of a pressure sensor in accordance with this disclosure.

FIG. 11 shows a plan view of yet another embodiment of a pressure sensor. Two sets of electrodes 1120, 1140 are placed in proximity to a substrate 1160. In an embodiment, one set of the electrodes is operatively connected to a signal generator and the other set a receiver and ultimately to circuitry or software for processing the received signals. A plurality of variably resistive conductive deformable elements 1150 are spaced out over one or more of the electrodes 1120, 1140, variably resistive conductive deformable elements 1150 exhibit variable resistance which increases with pressure.

Because the conductive nature of the variably resistive conductive deformable elements 1150 may impede hover range, in an embodiment, the deformable elements 1150 are selectively placed on the sensor to permit unimpeded hover and contact sensing on some portions, in addition to the pressure sensing as described. In an embodiment, a non-conductive deformable material (not shown) is disposed on the surface making the surface even or smooth to the touch despite some areas having conductive material.

It will be apparent to a person of skill in the art in view of this disclosure that additional electrodes can be used to transmit or receive signal. It will also be apparent to a person of skill in the art in view of this disclosure that additional electrodes can be used to transmit orthogonal signals from one another. Moreover, it will be apparent to a person of skill in the art in view of this disclosure that each electrode can be used to transmit multiple orthogonal frequencies simultaneously, and the signal processor can use the multiple frequency signals to obtain complementary phase or magnitude information. In an embodiment, certain frequencies (e.g., low frequencies) may exhibit greater changes from small changes in resistance, and other frequencies may exhibit greater changes from large changes in resistance. In an embodiment, changes are measured in phase. In an embodiment, changes are measured in magnitude. In an embodiment, both phase changes and magnitude changes are used to determine pressure.

An aspect of the disclosure is a pressure sensor. The pressure sensor comprises a plurality of transmit electrodes, each adapted to be operatively connected to a signal generator; a plurality of receive electrodes, each adapted to be operatively connected to a signal receiver and signal processor; and a deformable element located proximate to at least one of the plurality of transmit electrodes or at least one of the plurality of receive electrodes, wherein the deformable element is a variably resistive conductive material; wherein the plurality of transmit electrodes, the plurality of receive electrodes and the deformable element are positioned such that deformation of the deformable element causes a change in coupling between at least one of the plurality of transmit electrodes and at least one of the plurality of receive electrodes, wherein the change in coupling between the at least one of the plurality of transmit electrodes and the at least one of the plurality of receive electrodes provides information regarding a pressure event. In an embodiment, the change in coupling is proportional to the pressure event. In an embodiment, the sensor also comprises: a signal generator adapted to generate a first signal; a signal receiver and signal processor adapted to detect a measurement corresponding to the first signal as it is received by the receiver. In an embodiment, the measurement is one selected from the group consisting of: magnitude and phase.

Another aspect of the disclosure is a pressure sensitive device. The pressure sensitive device comprises a plurality of transmit electrodes, each adapted to be operatively connected to a signal generator; a plurality of receive electrodes, each adapted to be operatively connected to a signal receiver and signal processor; and a deformable element located proximate to at least one of the plurality of transmit electrodes or at least one of the plurality of receive electrodes, wherein the deformable element is a variably resistive conductive material; wherein the plurality of transmit electrodes, the plurality of receive electrodes and the deformable element are positioned such that deformation of the deformable element causes a change in coupling between at least one of the plurality of transmit electrodes and at least one of the plurality of receive electrodes, wherein the change in coupling between the at least one of the plurality of transmit electrodes and the at least one of the plurality of receive electrodes provides information regarding a pressure event.

Another aspect of the present disclosure is a pressure sensor. The pressure sensor comprises a transmit electrode adapted to be operatively connected to a signal generator; a receive electrode adapted to be operatively connected to a signal receiver and signal processor; and a deformable element located proximate to at least one of the transmit electrode or the receive electrode, wherein the deformable element is a variably resistive conductive material; wherein the transmit electrode, the receive electrode and the deformable element are positioned such that deformation of the deformable element causes a change in coupling between the transmit electrode and the receive electrode, wherein the change in coupling between the transmit electrode and receive electrode provides information regarding a pressure event.

In an embodiment, multiple frequencies can be transmitted as part of a first signal. In an embodiment, a plurality of transmit electrodes and a plurality of receive electrodes are employed in a sensor. In an embodiment, each of the transmit electrodes can be used to transmit one or more unique, frequency-orthogonal signals. In an embodiment, a Fourier analysis is done on the received signals. In an embodiment, the signals received by each receiver are sampled over a sampling period (an integration period) and processed using a fast Fourier transform (FFT). In an embodiment, the FFT provides an in phase (I) and quadrature (Q) component for each of the frequency-orthogonal signals. In an embodiment, the process of sampling is done multiple times. In an embodiment, changes in the magnitude or phase are used to identify a pressure event. In an embodiment, changes in magnitude or phase of a given frequency received on a given receiver are used to localize and/or measure a pressure event. In an embodiment, changes in at least one of magnitude and phase for each of the unique frequency-orthogonal signals as received on each of the receivers are used to localize and/or measure a pressure event. In an embodiment, changes in phase, for each of the unique frequency-orthogonal signals, as received on each of the receivers, are used to produce a phase-measured heatmap of pressure events. In an embodiment, changes in magnitude, for each of the unique frequency-orthogonal signals, as received on each of the receivers, are used to produce a magnitude-measured heatmap of pressure events. In an embodiment, the phase-measured heatmap and magnitude-measured heatmap are used to identify, localize and measure pressure events. In an embodiment, changes in both magnitude and phase, for each of the unique frequency-orthogonal signals, as received on each of the receivers, are used to produce a heatmap of pressure events.

The present systems are described above are described above with reference to high level block diagrams and operational illustrations of sensor stackups using capacitive, or FMT, or FMT-like systems. It is understood that the methods and apparatus (e.g., hardware and software) required to operate the novel sensor and sensor stackups may be implemented by means of analog or digital hardware and computer program instructions. Computer program instructions may be provided to a processor of a general purpose computer, special purpose computer, ASIC, or other programmable data processing apparatus, such that the instructions, which execute via a processor of a computer or other programmable data processing apparatus, implements the functions/acts specified herein or as identified in the references cited herein.

An aspect of the present disclosure is a pressure sensor. The pressure sensor comprises a plurality of transmit electrodes, each adapted to be operatively connected to a signal generator; a plurality of receive electrodes, each adapted to be operatively connected to a signal receiver and signal processor; and a deformable element located proximate to at least one of the plurality of transmit electrodes or at least one of the plurality of receive electrodes, wherein the deformable element is a variably resistive conductive material; wherein the plurality of transmit electrodes, the plurality of receive electrodes and the deformable element are positioned such that deformation of the deformable element causes a change in coupling between at least one of the plurality of transmit electrodes and at least one of the plurality of receive electrodes, wherein the change in coupling between the at least one of the plurality of transmit electrodes and the at least one of the plurality of receive electrodes provides information regarding a pressure event.

Another aspect of the present disclosure is a pressure sensitive device. The pressure sensitive device comprises a plurality of transmit electrodes, each adapted to be operatively connected to a signal generator; a plurality of receive electrodes, each adapted to be operatively connected to a signal receiver and signal processor; and a deformable element located proximate to at least one of the plurality of transmit electrodes or at least one of the plurality of receive electrodes, wherein the deformable element is a variably resistive conductive material; wherein the plurality of transmit electrodes, the plurality of receive electrodes and the deformable element are positioned such that deformation of the deformable element causes a change in coupling between at least one of the plurality of transmit electrodes and at least one of the plurality of receive electrodes, wherein the change in coupling between the at least one of the plurality of transmit electrodes and the at least one of the plurality of receive electrodes provides information regarding a pressure event.

Still yet another aspect of the present invention is a pressure sensor. The pressure sensor comprises a transmit electrode adapted to be operatively connected to a signal generator; a receive electrode adapted to be operatively connected to a signal receiver and signal processor; a deformable element located proximate to at least one of the transmit electrode or the receive electrode, wherein the deformable element is a variably resistive conductive material; and wherein the transmit electrode, the receive electrode and the deformable element are positioned such that deformation of the deformable element causes a change in coupling between the transmit electrode and the receive electrode, wherein the change in coupling between the transmit electrode and receive electrode provides information regarding a pressure event.

While the invention has been particularly shown and described with reference to a preferred embodiment thereof, it will be understood by those skilled in the art that various changes in form and details may be made therein without departing from the spirit and scope of the invention.

The invention claimed is:

1. A pressure sensor, comprising:
   a plurality of transmit electrodes, each adapted to be operatively connected to a signal generator;
   a plurality of receive electrodes, each adapted to be operatively connected to a signal receiver and signal processor;
   a deformable element located proximate to at least one of the plurality of transmit electrodes or at least one of the plurality of receive electrodes, wherein the deformable element is a variably resistive conductive material; and
   wherein the plurality of transmit electrodes, the plurality of receive electrodes and the deformable element are positioned such that deformation of the deformable element causes a change in resistance of the variably resistive conductive material thereby changing capacitive coupling between at least one of the plurality of transmit electrodes and at least one of the plurality of receive electrodes, wherein a measurement of the change in capacitive coupling between the at least one of the plurality of transmit electrodes and the at least one of the plurality of receive electrodes is preocessed with a Fourier tranform and used to form a heat map that provides information regarding a pressure event.

2. The pressure sensor of claim 1, wherein the change in capacative coupling is proportional to deformation of the deformable element.

3. The pressure sensor of claim 2, wherein the signal generator is adapted to generate at least one frequency orthogonal signal on each of the plurality of transmit electrodes, respectively.

4. The pressure sensor of claim 3, wherein the signal receiver and signal processor are adapted to detect a measurement corresponding to the each of the generated at least one frequency orthogonal signals as the same is received from each of the plurality of receive electrodes.

5. The pressure sensor of claim 4, wherein the measurement is one selected from the group consisting of magnitude and phase.

6. The pressure sensor of claim 1, further comprising a dielectric layer located between at least one of the plurality of transmit electrodes and at least one of the plurality of receive electrodes.

7. The pressure sensor of claim 1, further comprising an electromagnetic interference shield.

8. The pressure sensor of claim 1, wherein the deformable element is one of a plurality of deformable elements located proximate to where one of the plurality of transmit electrodes couples with one of the plurality of receive electrodes.

9. A pressure sensitive device, comprising:
   a plurality of transmit electrodes, each adapted to be operatively connected to a signal generator;
   a plurality of receive electrodes, each adapted to be operatively connected to a signal receiver and signal processor;
   a deformable element located proximate to at least one of the plurality of transmit electrodes or at least one of the plurality of receive electrodes, wherein the deformable element is a variably resistive conductive material; and
   wherein the plurality of transmit electrodes, the plurality of receive electrodes and the deformable element are positioned such that deformation of the deformable element causes a change in resistance of the varibly resistive conductive material thereby changing capacitive coupling between at least one of the plurality of transmit electrodes and at least one of the plurality of receive electrodes, wherein a measurement of the change in capacitive coupling between the at least one of the plurality of transmit electrodes and the at least one of the plurality of receive electrodes is processed with a Fourier transform and used to form a heat map that provides information regarding a pressure event.

10. The pressure sensitive device of claim 9, wherein the change in capacitive coupling is proportional to deformation of the deformable element.

11. The pressure sensitive device of claim 10, wherein the signal generator is adapted to generate at least one frequency orthogonal signal on each of the plurality of transmit electrodes, respectively.

12. The pressure sensitive device of claim 11, wherein the signal receiver and signal processor are adapted to detect a measurement corresponding to the each of the generated at least one frequency orthogonal signals as the same is received from each of the plurality of receive electrodes.

13. The pressure sensitive device of claim 12, wherein the measurement is one selected from the group consisting of magnitude and phase.

14. The pressure sensitive device of claim 9, further comprising a dielectric layer located between at least one of the plurality of transmit electrodes and at least one of the plurality of receive electrodes.

15. The pressure sensitive device of claim 9, further comprising an electromagnetic interference shield.

16. The pressure sensitive device of claim 9, wherein the deformable element is one of a plurality of deformable elements located proximate to where one of the plurality of transmit electrodes couples with one of the plurality of receive electrodes.

17. A pressure sensor, comprising:
 a transmit electrode adapted to be operatively connected to a signal generator;
 a receive electrode adapted to be operatively connected to a signal receiver and signal processor;
 a deformable element located proximate to at least one of the transmit electrode or the receive electrode, wherein the deformable element is a variably resistive conductive material; and
 wherein the transmit electrode, the receive electrode and the deformable element are positioned such that deformation of the deformable element causes a change in resistance of the varibly resistive conductive material thereby changing capacaitive coupling between the transmit electrode and the receive electrode, wherein a measurement of the change in capacitive coupling between the transmit electrode and receive electrode is processed with a Fourier transform and used to form a heat map that provides information regarding a pressure event.

18. The pressure sensor of claim 17, wherein the change in capacitive coupling is proportional to deformation of the deformable element.

19. The pressure sensor of claim 18, wherein the signal generator is adapted to generate at least one frequency orthogonal signal on each of the plurality of transmit electrodes, respectively.

20. The pressure sensor of claim 19, wherein the signal receiver and signal processor are adapted to detect a measurement corresponding to the each of the generated at least one frequency orthogonal signals as the same is received from each of the plurality of receive electrodes.

\* \* \* \* \*